US012643231B2

(12) United States Patent
Kim et al.

(10) Patent No.: US 12,643,231 B2
(45) Date of Patent: Jun. 2, 2026

(54) GRIP DEVICE AND CONTROLLING METHOD THEREOF

(71) Applicant: SAMSUNG ELECTRONICS CO., LTD., Suwon-si (KR)

(72) Inventors: Hyunwoo Kim, Suwon-si (KR); Sahnggyu Park, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/210,955

(22) Filed: Jun. 16, 2023

(65) Prior Publication Data

US 2023/0330850 A1      Oct. 19, 2023

Related U.S. Application Data

(63) Continuation of application No. PCT/KR2021/019947, filed on Dec. 27, 2021.

(30) Foreign Application Priority Data

Feb. 18, 2021      (KR) ........................ 10-2021-0021887

(51) Int. Cl.
*B25J 9/16* (2006.01)
*B25J 13/08* (2006.01)
(Continued)

(52) U.S. Cl.
CPC ............. *B25J 9/1633* (2013.01); *B25J 15/08* (2013.01)

(58) Field of Classification Search
CPC ........ B25J 9/1633; B25J 15/08; B25J 9/1694; B25J 13/082; B25J 15/02; B25J 9/1612;
(Continued)

(56) References Cited

U.S. PATENT DOCUMENTS 4,745,812 A      5/1988   Amazeen et al.
5,553,500 A *    9/1996   Grahn ..................... G01L 1/255
                                                              73/628
(Continued)

FOREIGN PATENT DOCUMENTS

JP            2006-297542 A      11/2006
JP            2011-121169 A      6/2011
(Continued)

OTHER PUBLICATIONS

Aono et al., "WO-20190127036-A1," Jan. 17, 2019 (Year: 2019).*

(Continued)

*Primary Examiner* — Adam R Mott
*Assistant Examiner* — Bryon Xavier Kasper
(74) *Attorney, Agent, or Firm* — Sughrue Mion, PLLC

(57) ABSTRACT

A grip device includes a first finger with a groove on a gripping surface thereof; a second finger facing the first finger; a middle member inserted into the groove of the first finger and covering the gripping surface; a plurality of mono-axial force sensors each positioned on one of a plurality of inclined surfaces of the groove and configured to detect a force applied to the middle member; a driving motor configured to adjust a gripping force of the first finger and the second finger; and a processor. The processor is configured to calculate a force vector applied to the middle member based on sensing values received from the force sensors, and, based on a force component of the force vector in a direction parallel to a surface of the middle member being less than a preset value, apply a greater gripping force by the first and second fingers.

15 Claims, 9 Drawing Sheets

(51) Int. Cl.

| | |
|---|---|
| *B25J 15/00* | (2006.01) |
| *B25J 15/02* | (2006.01) |
| *B25J 15/08* | (2006.01) |
| *G06N 20/00* | (2019.01) |

(58) Field of Classification Search

CPC . B25J 13/08; B25J 15/0004; B25J 9/00; B25J 9/16; B25J 9/1669; B25J 13/084; B25J 15/04; B25J 9/1653; B25J 11/0095; B25J 13/083; G05B 2219/39409; G05B 2219/39527; G05B 2219/39528; G06N 20/00; G01L 5/16; G01L 5/226; G01L 5/228; G01L 5/009

See application file for complete search history.

(56) References Cited

U.S. PATENT DOCUMENTS

| | | | |
|---|---|---|---|
| 7,547,053 B2 | 6/2009 | Yoshida et al. | |
| 8,260,463 B2 | 9/2012 | Nakamoto et al. | |
| 8,504,205 B2 | 8/2013 | Summer et al. | |
| 8,515,579 B2 | 8/2013 | Alcazar et al. | |
| 9,495,750 B2 | 11/2016 | Miyatani et al. | |
| 9,808,936 B2 | 11/2017 | Chavan Dafle et al. | |
| 10,792,809 B2 | 10/2020 | Bingham et al. | |
| 2009/0076657 A1* | 3/2009 | Tsuboi | G05B 13/021 |
| | | | 700/275 |
| 2011/0193363 A1* | 8/2011 | Nishiwaki | G01L 5/167 |
| | | | 901/33 |
| 2013/0289767 A1* | 10/2013 | Lim | A61B 34/77 |
| | | | 700/253 |
| 2020/0171672 A1* | 6/2020 | Nakayama | B25J 15/0253 |
| 2020/0306986 A1* | 10/2020 | Keraly | B25J 13/085 |
| 2021/0101292 A1* | 4/2021 | Kuppuswamy | B25J 13/082 |
| 2021/0122039 A1 | 4/2021 | Su et al. | |
| 2021/0260776 A1 | 8/2021 | Nagakari et al. | |
| 2021/0394360 A1* | 12/2021 | Hwang | B25J 9/1612 |
| 2023/0102104 A1 | 3/2023 | Choi et al. | |

FOREIGN PATENT DOCUMENTS

| | | | |
|---|---|---|---|
| JP | 5013270 B2 | 8/2012 | |
| JP | 2022-552629 A | 12/2022 | |
| KR | 10-2013-0108674 A | 10/2013 | |
| KR | 10-1381500 B1 | 4/2014 | |
| KR | 10-2015-0137445 A | 12/2015 | |
| KR | 10-2016-0124960 A | 10/2016 | |
| KR | 10-1989949 B1 | 6/2019 | |
| KR | 10-2022-0013076 A | 2/2022 | |
| WO | WO-2019012736 A1 * | 1/2019 | G01N 19/02 |
| WO | 2019/244710 A1 | 12/2019 | |

OTHER PUBLICATIONS

Aono et al., "WO-2019012736-A1," Jan. 17, 2019 (Year: 2019).*

Francisco E. Viña B et al., "In-hand manipulation using gravity and controlled slip", 2015 IEEE/RSJ International Conference on Intelligent Robots and Systems (IROS), 2015, 7 pages.

Xiaoyou Zhang et al., "Slip detection by array-type pressure sensor for a grasp task," 2012 IEEE International Conference on Mechatronics and Automation, 2012, pp. 2198-2202.

International Search Report (PCT/ISA/210) issued by the International Searching Authority on Mar. 29, 2022 in corresponding International Application No. PCT/KR2021/019947.

Written Opinion (PCT/ISA/237) issued by the International Searching Authority on Mar. 29, 2022 in corresponding International Application No. PCT/KR2021/019947.

Communication issued Jan. 26, 2026 by the Korean Ministry of Intellectual Property for KR Patent Application No. 10-2021-0021887.

* cited by examiner

<u>1</u>

GRIP DEVICE AND CONTROLLING METHOD THEREOF

CROSS-REFERENCE TO RELATED APPLICATIONS

This application is a bypass continuation application of International Patent Application No. PCT/KR2021/019947, filed on Dec. 27, 2021, which is based on and claims priority to Korean Patent Application No. 10-2021-0021887, filed on Feb. 18, 2021 with the Korean Intellectual Property Office, the disclosures of each of which are incorporated by reference herein in their entireties.

BACKGROUND

1. Field

The disclosure relates to a grip device and a controlling method thereof and, more specifically, to a grip device for detecting a slip using a plurality of mono-axial force sensors and a controlling method thereof.

2. Description of Related Art

With the development electronic technology, various electronic devices have been developed. In particular, various robot devices performing tasks in place of humans have been developed in the field of industrial sites, medical field, space, house works, and the like. The robot device may include a grip device capable of performing various tasks such as grip, assembly, transfer, welding, and the like, of an object.

However, when the grip device moves after gripping the object with a small force, slip between the grip device and the object occurs and the object risks being dropped. Accordingly, a technology has been developed to detect whether slip occurs between a grip device and an object by using a force sensor. However, there is a problem in that a multiaxial force sensor and an array-type force sensor are expensive and large in size.

SUMMARY

The disclosure is to provide a grip device for detecting a slip by using a plurality of mono-axial force sensors and a controlling method thereof.

A grip device according to one or more embodiments of the disclosure includes a first finger comprising a groove formed as a plurality of inclined surfaces on a gripping surface of the first finger; a second finger facing the first finger; a middle member comprising a protrusion region inserted into the groove on the gripping surface of the first finger, the middle member covering the gripping surface of the first finger, a first surface of the middle member facing the gripping surface of the first finger, a second surface of the middle member being opposite to the first surface; a plurality of mono-axial force sensors, each mono-axial force sensor being respectively positioned on one of the plurality of inclined surfaces and configured to detect a force applied to the middle member by an object gripped between the first finger and the second finger; a driving motor configured to adjust a gripping force of the first finger and the second finger; and a processor. The processor is configured to calculate a force vector applied to the middle member based on sensing values received from the plurality of mono-axial force sensors, and, based on a first force component of the force vector in a direction parallel to the second surface of the middle member being less than a preset value when the first finger and the second finger grip an object by a first gripping force, control the driving motor such that the first finger and the second finger grip the object by a second gripping force that is greater than the first gripping force.

The processor may be further configured to, based on a second force component of the force vector in a second direction being less than a predetermined value when the first finger and the second finger move in a first direction opposite to the second direction while gripping the object, control the driving motor such that the first finger and the second finger grip the object with the second gripping force.

The plurality of inclined surfaces may include a first inclined surface and a second inclined surface, and the plurality of mono-axial force sensors may include first and second mono-axial force sensors provided on the first and second inclined surfaces, respectively.

The first inclined surface and the second inclined surface may be angled to face at least partially vertically.

The plurality of inclined surfaces may include a first inclined surface, a second inclined surface, and a third inclined surface forming a triangular pyramid shape, and the plurality of mono-axial force sensors may include first, second, and third mono-axial force sensors provided on the first, second, and third inclined surfaces, respectively.

The plurality of inclined surfaces may include a first inclined surface, a second inclined surface, a third inclined surface, and a fourth inclined surface forming a shape of a quadrangular pyramid, and the plurality of mono-axial force sensors may include first, second, third, and fourth mono-axial force sensors disposed on the first, second, third, and fourth inclined surfaces, respectively.

The grip device may further include a camera configured to capture an image of the object, and the processor may be further configured to identify at least one of a shape, a weight, a physical property, and a volume of the object based on the captured image, and determine the first gripping force based on a result of the identifying.

The processor may be further configured to determine a threshold gripping force at which the object begins to break based on the result of the identifying, and based on the second gripping force being greater than or equal to the threshold gripping force, control the driving motor so that the first finger and the second finger decrease the gripping force.

The grip device may further include a memory storing a learning model trained to identify a feature of the object based on input of image information of the object, and the processor may be configured to identify the at least one of the shape, the weight, the physical property, and the volume of the object further based on the learning model.

The second surface of the middle member may be formed as a plane.

According to one or more embodiments, a method of controlling a grip device including groove formed as a plurality of inclined surfaces on a gripping surface of the first finger, a second finger facing the first finger, a middle member comprising a protrusion region inserted into the groove on the gripping surface of the first finger, the middle member covering the gripping surface of the first finger, a first surface of the middle member facing the gripping surface of the first finger, a second surface of the middle member being opposite to the first surface, and a plurality of mono-axial force sensors, each mono-axial force sensor being respectively positioned on one of the plurality of inclined surfaces and configured to detect a force applied to the middle member by an object gripped between the first finger and the second finger may include gripping an object between the first finger and the second finger by a first gripping force; receiving sensing values from the plurality of mono-axial force sensors; calculating a force vector applied to the middle member based on the received sensing values; confirming slip based on a comparison of a first force component of the force vector in a direction parallel to the second surface of the middle member and a preset value; and, based on a determination that slip has occurred, adjusting a gripping force of the first finger and the second finger to a second gripping force greater than the first gripping force.

The confirming of the slip may further include confirming slip based on a second force component of the force vector in a second direction being less than a predetermined value when the first finger and the second finger move in a first direction opposite to the second direction while gripping the object.

The grip device may further include a camera configured to capture an image of the object, and the method may further include identifying at least one of a shape, a weight, a physical property, and a volume of the object based on the captured image, and determining the first gripping force based on a result of the identifying.

The grip device may further include a memory storing a learning model trained to identify a feature of the object based on input of image information of the object, and the identifying of the at least one of the shape, the weight, the physical property, and the volume of the object is further based on the learning model.

The method may further include determining a threshold gripping force at which the object begins to break based on the result of the identifying; and based on the second gripping force being greater than or equal to the threshold gripping force, decreasing the gripping force applied by the first finger and the second finger.

The plurality of inclined surfaces may include a first inclined surface and a second inclined surface, and the plurality of mono-axial force sensors may include first and second mono-axial force sensors provided on the first and second inclined surfaces, respectively.

The first inclined surface and the second inclined surface may be angled to face at least partially vertically.

The plurality of inclined surfaces may include a first inclined surface, a second inclined surface, and a third inclined surface forming a triangular pyramid shape, and the plurality of mono-axial force sensors may include first, second, and third mono-axial force sensors provided on the first, second, and third inclined surfaces, respectively.

The plurality of inclined surfaces may include a first inclined surface, a second inclined surface, a third inclined surface, and a fourth inclined surface forming a shape of a quadrangular pyramid, and the plurality of mono-axial force sensors may include first, second, third, and fourth mono-axial force sensors disposed on the first, second, third, and fourth inclined surfaces, respectively.

The second surface of the middle member may be formed as a plane.

BRIEF DESCRIPTION OF THE DRAWINGS

The above and other aspects, features, and advantages of certain embodiments of the present disclosure will be more apparent from the following description taken in conjunction with the accompanying drawings, in which:
    disclosure.

DETAILED DESCRIPTION

Examples described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the present disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

It is to be understood that the terms such as "comprise" or "consist of" may, for example, be used to designate a presence of a characteristic, number, operation, element, component, or a combination thereof, and not to preclude a presence or a possibility of adding one or more of other characteristics.

In the disclosure, various embodiments of the disclosure and their components are described, but the disclosure is not necessarily limited thereto. Accordingly, some components may be changed or omitted and other components may be added. In addition, components may be disposed and arranged in different independent devices.

Furthermore, embodiments of the disclosure are described in detail with reference to the accompanying drawings and the contents described in the accompanying drawings, but the disclosure is not limited or restricted by embodiments.

The disclosure will be described in detail with reference to the drawings.

Figure 1:
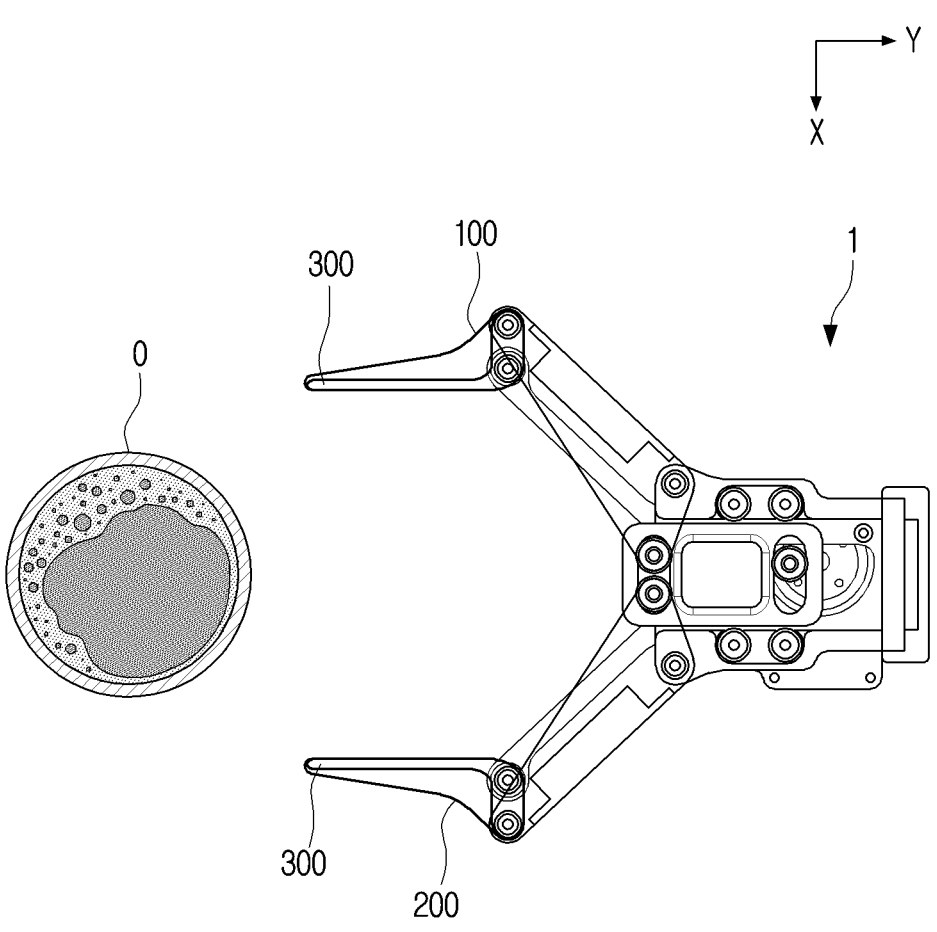
FIG. 1 is a top view of a grip device according to one or more embodiments of the FIG. 2 is a cross-sectional side view illustrating the grip device gripping an object, according to an embodiment of the disclosure.
Figure 2:
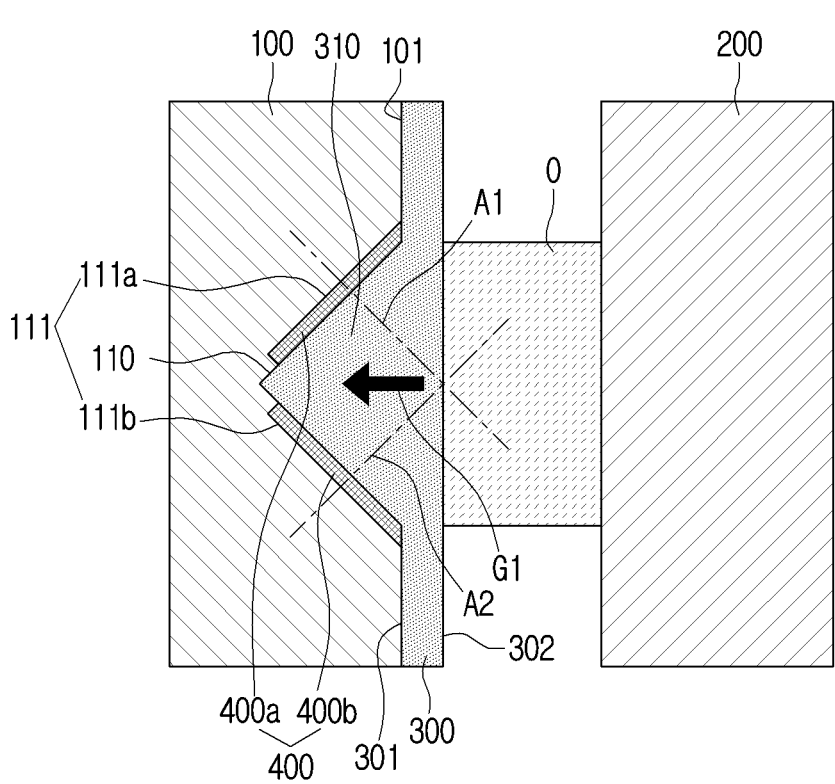
Figure 3:
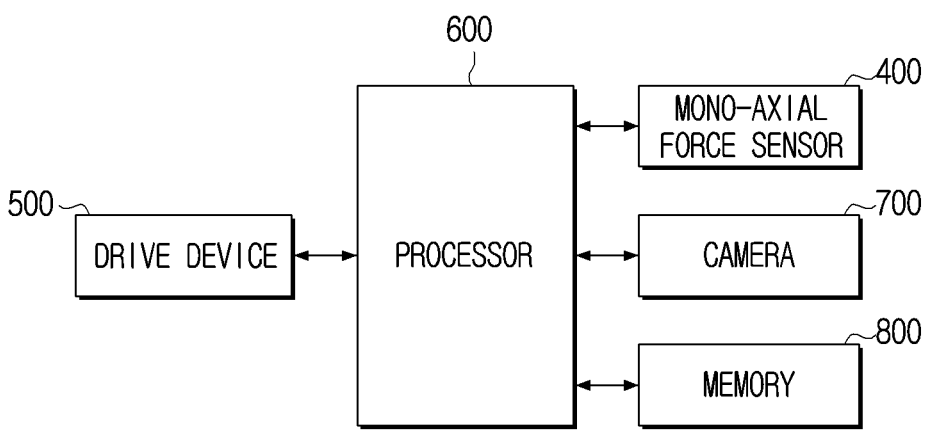
FIG. 3 is a block diagram illustrating functional components of the grip device, according to an embodiment of the disclosure.

FIG. 1 is a top view of a grip device according to one or more embodiments of the disclosure. FIG. 2 is a cross-sectional side view illustrating the grip device gripping an object, according to an embodiment of the disclosure. FIG. 3 is a block diagram illustrating functional components of the grip device, according to an embodiment of the disclosure.

Referring to FIGS. 1 to 3, a grip device 1 according to one or more embodiments of the disclosure may include a first finger 100, a second finger 200, a middle member 300, a plurality of mono-axial force sensors 400, and a processor 600.

The first finger 100 may include a groove 110 formed as a plurality of inclined surfaces 111 within a surface 101 of the first finger 100. The surface 101 may be termed a gripping surface herein.

A plurality of inclined surfaces 111 may be arranged to be non-parallel to the gripping surface 101 of the first finger 100. The plurality of inclined surfaces 111 may be arranged in different directions. The plurality of inclined surfaces 111 may be formed as flat or curved surfaces.

The shape of the groove 110 may refer to a space surrounded by a plurality of inclined surfaces 111. That is, the shape of the groove 110 may be determined according to the shape, size, and arrangement of the plurality of inclined surfaces 111.

The second finger 200 may face the first finger 100. The first finger 100 and second finger 200 may be arranged to face each other, and may grip an object O by adjusting an interval therebetween.

The middle member 300 may include a protrusion region 310 inserted into the gripping surface 101 of the first finger 100 and may cover the gripping surface 101 of the first finger 100. For example, the protrusion region 310 may be inserted into the groove 110 of the gripping surface 101.

A second surface 302 of the middle member 300 may be formed as a plane. That is, the first surface 301 of the middle member 300 may include the protrusion region 310, but the second surface 302 facing the second finger 200 may be formed as a plane to easily grip the object O.

The protrusion region 310 of the middle member 300 may have a shape corresponding to the groove 110. Accordingly, the groove 110 of the first finger 100 may be filled with the protrusion region 310 of the middle member 300 without gaps.

The plurality of mono-axial force sensors 400 may be arranged on the plurality of inclined surfaces 111, respectively, and may sense the force applied to the middle member 300 by means of an object O to be gripped. Specifically, each mono-axial force sensor 400 may be disposed between one of the inclined surfaces 111 and the protrusion region 310.

In detail, the middle member 300 may be disposed between the object O and the mono-axial force sensor 400 to transmit a force applied by the object O to the middle member 300 to the mono-axial force sensor 400.

The middle member 300 is formed of a material having high rigidity and low friction coefficient, and thus may transmit force from the object O to the mono-axial force sensor 400 without loss. For example, the middle member 300 may include polyacetal, but the material is not limited thereto.

In the meantime, a mono-axial force sensor 400 may be a force sensor having degree of freedom of 1. That is, the mono-axial force sensor 400 may sense only the magnitude of force in a specific direction. Specifically, each of a plurality of mono-axial force sensors 400 may sense the magnitude of force in a normal vector direction of an inclined surface 111 on which the mono-axial force sensor 400 is arranged.

For example, a first mono-axial force sensor 400a disposed on the first inclined surface 111a among the plurality of mono-axial force sensors 400 may sense only a force in an A1-axis direction, which is a normal vector of the first inclined surface 111a.

Also, for example, a second mono-axial force sensor 400b disposed on a second inclined surface 111b among the plurality of mono-axial force sensors 400 may sense only a force in the direction of an A2-axis direction, which is a normal vector of the second inclined surface 111b.

Although it has been described that only the first finger 100 has the above-described structure, the second finger 200 may also have the same or substantially the same structure as the first finger 100, as, for example, in an embodiment illustrated in FIG. 1. That is, the second finger 200 may have a groove formed on one surface facing the first finger 100, a plurality of mono-axial force sensors 400 may be arranged in the groove, and the middle member 300 may cover one surface of the second finger 200 while filling the groove of the second finger 200. Accordingly, the first finger 100 and second finger 200 may have a symmetrical structure with respect to the object O to be gripped with each other.

A drive device 500 may adjust the gripping force of the first finger 100 and second finger 200. Specifically, the drive device 500 may adjust the interval between the first finger 100 and second finger 200 to correspond to the width of the object O, and then may adjust the first finger 100 and second finger 200 to press the object O with a predetermined gripping force. The drive device 500 may be any suitable mechanism for operating the movement of the fingers to grip an object, such as a driving motor or set of motors.

The processor 600 may control the overall operation of the grip device 1. For this, the processor 600 may include one or more of a central processing unit (CPU), an application processor (AP), or a communication processor (CP). The processor 600 may be a micro control unit (MCU).

The processor 600 may drive an operating system or an application program to control hardware or software components connected to the processor 600, and may process and compute a variety of data. In addition, the processor 600 may load a command or data received from at least one of the other components into a volatile memory, process the loaded command or data, and store various data in the non-volatile memory.

The processor 600 may calculate the force vector applied to the middle member 300 based on the sensing values received from the plurality of mono-axial force sensors 400.

Specifically, although the mono-axial force sensor 400 may sense only force in a single direction, the processor 600 may calculate a force vector applied to the middle member 300 by combining magnitudes of forces in different directions sensed by the plurality of mono-axial force sensors 400.

The processor 600 may, based on a force component of the force vector in a direction parallel to the second surface 302 of the middle member 300 of the force vector being less than a preset value when the first finger 100 and second finger 200 grip the object O by a first gripping force G1, control the drive device 500 such that the first finger 100 and second finger 200 grip the object O by a second gripping force that is greater than the first gripping force G1.

Specifically, when the first finger 100 and second finger 200 grip the object O with a sufficiently large gripping force, a slip does not occur between the first finger 100 and the object O, and thus in the middle member 300, a static frictional force may be applied in a direction parallel to the second surface 302 of the middle member 300.

Accordingly, a component in a direction parallel to the second surface 302 of the middle member 300 among the force vectors applied to the middle member 300 may have a value greater than a preset value.

In the meantime, when the first finger 100 and second finger 200 grip the object O with a sufficiently small gripping force, a slip occurs between the first finger 100 and the object O, and thus the middle member 300 may be applied with a kinetic friction force in a direction parallel to the second surface 302 of the middle member 300.

Accordingly, a component in a direction parallel to the second surface 302 of the middle member 300 may have a value smaller than a preset value among force vectors applied to the middle member 300.

That is, the processor 600 may determine slip by comparing a component in a direction parallel to the second surface 302 of the middle member 300 among the force vectors applied to the middle member 300 by the object O with a preset value.

Thereafter, the processor 600 may control the drive device 500 so that the first finger 100 and second finger 200 grip the object O with a second gripping force greater than the first gripping force G1 when it is determined that the component in the direction parallel to the second surface 302 of the middle member 300 among the force vectors applied to the middle member 300 by the object O has a smaller value than a preset value.

The preset value may be determined by the maximum static coefficient of friction between the middle member 300 and the object O.

The processor 600 may control the drive device 500 such that the gripping force of the first finger 100 and second finger 200 is continuously increased when it is determined that the slip has occurred even after the first finger 100 and second finger 200 re-grip the object O with the second gripping force.

That is, the grip device 1 according to one or more embodiments of the disclosure uses a plurality of mono-axial force sensors 400 which measure forces in different directions without using a multi-axis force sensor or an array-type force sensor, and thus may easily determine the slip of the object O while becoming less expensive, light-weight, and miniaturized.

The grip device 1 may further include a camera 700 for capturing an image of the object O. The camera 700 may be a red, green, blue, distance (RGBD) camera. Accordingly, the camera 700 may acquire a 2D image and a three-dimensional (3D) image of the object O.

The processor 600 may identify at least one of a shape, a weight, a physical property, and a volume of the object O based on an image captured by the camera 700, and may determine the first gripping force G1 based on the identified result.

Accordingly, since the first finger 100 and second finger 200 grip the object O with a sufficiently large gripping force in consideration of the weight of the object O, slip may be prevented, and it is possible to minimize trial and error that continuously raises the gripping force even if a slip occurs.

In addition, when the first finger 100 and second finger 200 first grip an object O for a first time in consideration of the physical properties of the object O, it is possible to prevent the object O from being damaged by a large gripping force.

The processor 600 may determine a threshold gripping force at which the object O begins to break based on the identified result, and based on the second gripping force being greater than or equal to the threshold gripping force, control the drive device 500 so that the first finger 100 and second finger 200 decrease the gripping force applied to grip the object, and thereby apply less than the second gripping force.

The threshold gripping force may be determined by breaking strength, yield strength, tensile strength, etc. of the object O. Accordingly, even if the gripping force is continuously increased by the processor 600 by the first finger 100 and second finger 200, it is possible to prevent the object from being unintentionally damaged by the first finger 100 and second finger 200.

The grip device 1 may further include a memory 800 storing a learning model for identifying a feature of the object corresponding to the image information based on image information on the object O being inputted.

The processor 600 may identify at least one of a shape, a weight, a physical property, and a volume of the object O by using the captured image and the learning model.

That is, the processor 600 may more precisely determine gripping force and slip by using a learning model stored in the memory 800 with an image captured by the camera 700.

Figure 4:
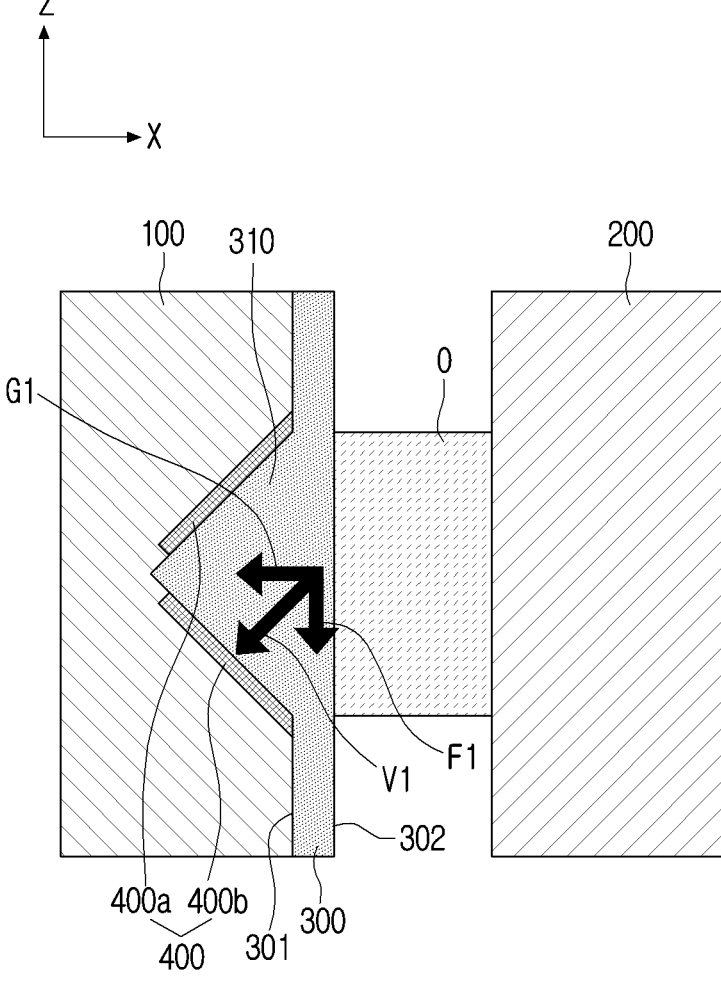
FIG. 4 is a diagram illustrating a condition without slippage between first finger and second finger and an object, according to an embodiment of the disclosure.
Figure 5:
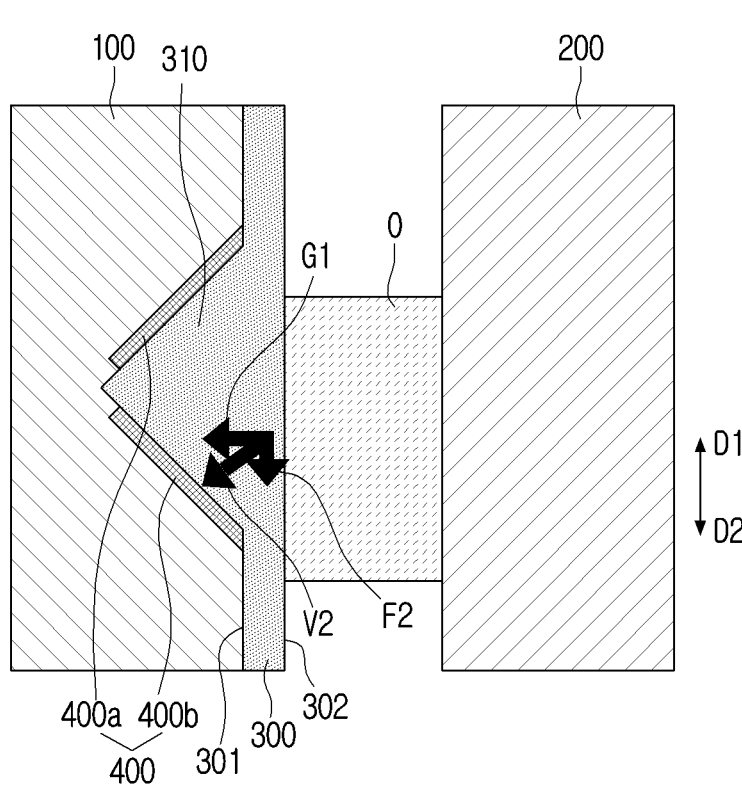
FIG. 5 is a diagram illustrating a case a condition with slippage between first finger and second finger and an object, according to an embodiment of the disclosure.

FIG. 4 is a diagram illustrating a condition without slippage between first finger and second finger and an object, according to an embodiment of the disclosure. FIG. 5 is a diagram illustrating a condition with slippage between first finger and second finger and an object, according to an embodiment of the disclosure.

Referring to FIG. 4, when the first finger 100 and second finger 200 press the object O with a sufficiently large first gripping force G1, slip may be prevented. That is, the friction force F1 that acts between the object O and the middle member 300 may be a static frictional force.

The processor 600 may calculate a first vector (V1), which is a force vector applied to the middle member 300, by a sensing value received from a plurality of mono-axial force sensors.

The processor 600 may determine whether a slip is occurring by comparing a component parallel to the second surface 302 of the middle member 300 of the first vector V1 with a preset value. That is, the processor 600 may compare an F1 value with a preset value, and determine that a slip does not occur since the F1 is greater than a preset value.

In contrast, referring to FIG. 5, when the first finger 100 and second finger 200 press an object O with an insufficiently large first gripping force G1, a slip may occur. That is, the friction force F2 that acts between the object O and the middle member 300 may be a kinetic friction force.

The processor 600 may, based on a force component in a second direction D2 opposite to the first direction D1 of the second vector V2 being less than a predetermined value when the first finger 100 and second finger 200 move in a first direction D1 while gripping the object O, control the drive device 500 to grip the object O with the second gripping force. The second vector V2 may be a force vector applied to the middle member 300 by the object O.

The processor 600 may calculate a second vector V2, which is a force vector applied to the middle member 300, by the sensing value received from the plurality of mono-axial force sensors.

The processor 600 may compare a component parallel to the second surface 302 of the middle member 300 of the second vector V2 with a preset value to determine slip. That is, the processor 600 may compare the F2 with a preset value, and determine that a slip has occurred since the F2 value is smaller than a preset value.

The processor 600 may control the drive device 500 such that the first finger 100 and second finger 200 have a gripping force greater than the first gripping force G1.

Figure 6:
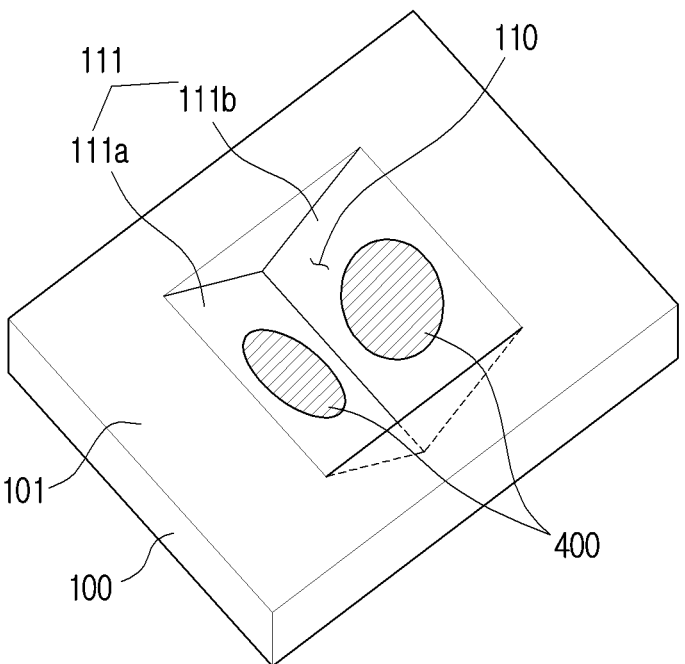
FIGS. 6 to 8 are diagrams illustrating various shapes of a groove of a first finger, according to various embodiments of the disclosure.
Figure 7:
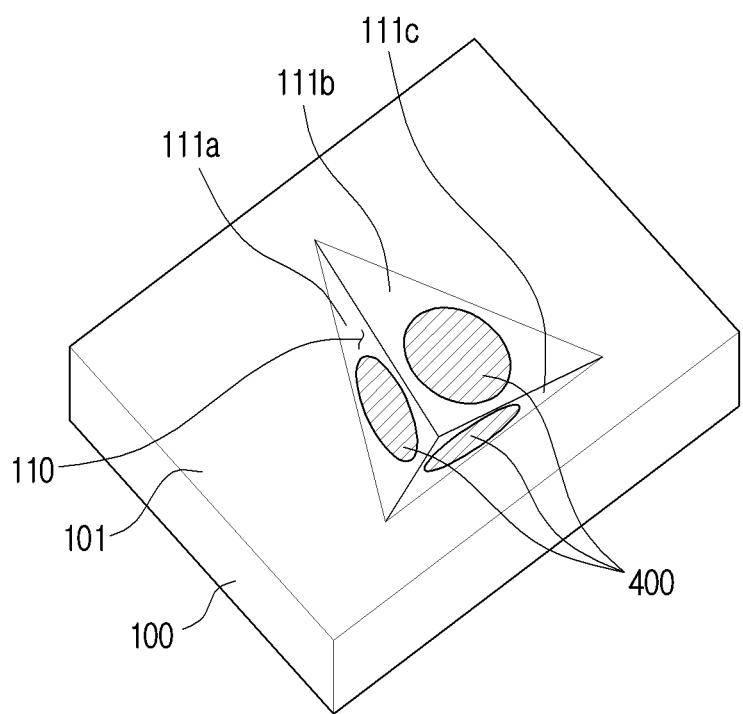
Figure 8:
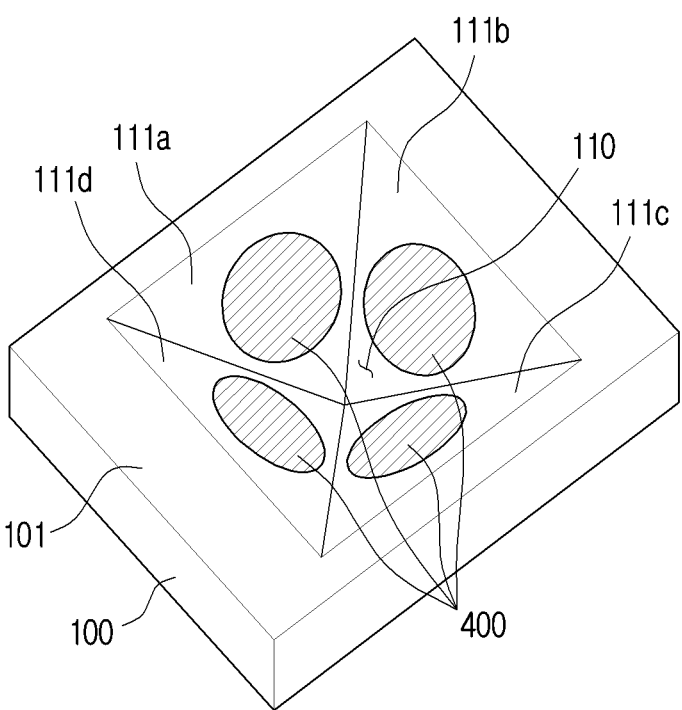

FIGS. 6 to 8 are diagrams illustrating various shapes of a groove of a first finger, according to various embodiments of the disclosure.

Referring to FIG. 6, the plurality of inclined surfaces 111 may include a first inclined surface 111*a* and a second inclined surface 111*b*, and the plurality of mono-axial force sensors 400 may include two mono-axial force sensors 400 disposed in each of the first inclined surface 111*a* and second inclined surface 111*b*.

The first inclined surface 111*a* and second inclined surface 111*b* may be angled to face at least partially vertically. Accordingly, when the first finger 100 and second finger 200 lift the object O upwards vertically, the two mono-axial force sensors 400 may easily detect a slip downwards in a vertical direction.

Referring to FIG. 7, the plurality of inclined surfaces 111 may include the first inclined surface 111*a*, the second inclined surface 111*b*, and a third inclined surface 111*c* forming a triangular pyramid shape, and the plurality of mono-axial force sensors 400 may include three mono-axial force sensors 400 disposed on the first, second, and third inclined surfaces 111*a*, 111*b*, 111*c*, respectively.

Referring to FIG. 8, the plurality of inclined surfaces 111 may include the first inclined surface 111*a*, the second inclined surface 111*b*, the third inclined surface 111*c*, and a fourth inclined surface 111*d* forming a shape of a quadrangular pyramid, and the plurality of mono-axial force sensors 400 may include four mono-axial force sensors disposed on the first, second, third, and fourth inclined surfaces 111*a*, 111*b*, 111*c*, 111*d*, respectively.

That is, the mono-axial force sensors of FIGS. 7 and 8 sense forces in three or four directions different from each other, and thus may more precisely detect the force applied to the middle member. Accordingly, the grip device 1 may detect a slip in various directions.

Figure 9:
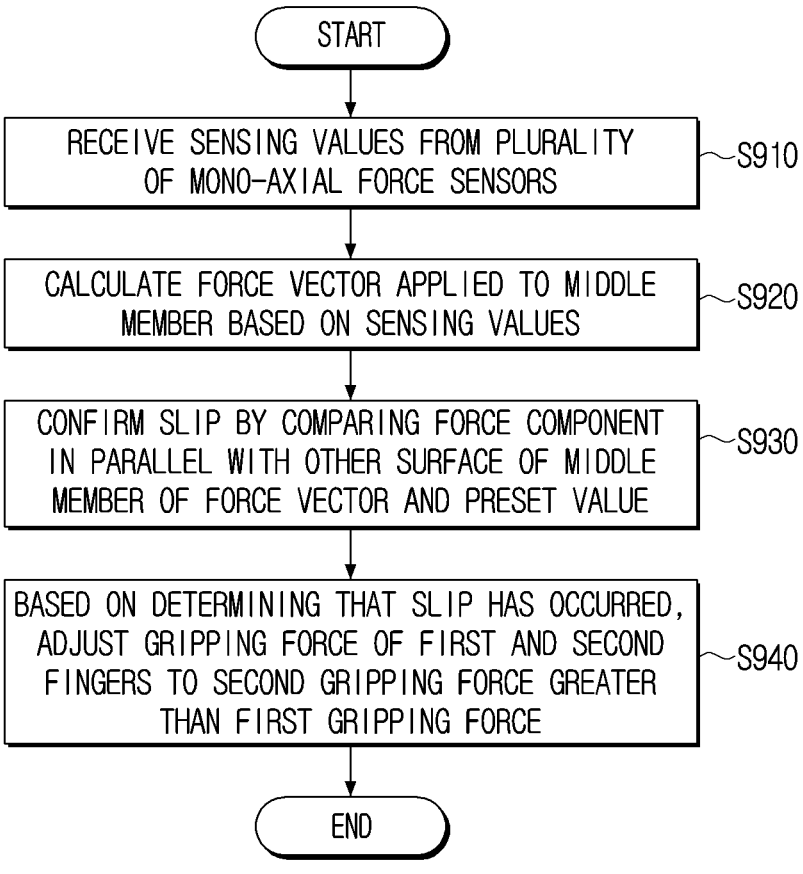
FIG. 9 is a flowchart illustrating a control method of a grip device according to one or more embodiments.

FIG. 9 is a flowchart illustrating a control method of a grip device according to one or more embodiments.

Referring to FIG. 9, according to one or more embodiments, a method of controlling the grip device 1 may include receiving sensing values from the plurality of mono-axial force sensors 400 in operation S910; calculating a force vector applied to the middle member 300 based sensing values in operation S920; confirming slip by comparing a force component in parallel with the second surface 302 of the middle member 300 of the force vector and a preset value in operation S930; and based on determining that slip has occurred, adjusting the gripping force of the first finger 100 and second finger 200 to a second gripping force greater than the first gripping force G1 in operation S940.

The confirming in operation S930 may include, based on a force component in a second direction opposite to the first direction of the force vector being less than a predetermined value when the first finger 100 and second finger 200 move in a first direction while gripping the object O, confirming that slip has occurred.

The controlling method of the grip device 1 according to one or more embodiments of the disclosure may further identifying at least one of a shape, a weight, a physical property, and a volume of the object O based on the image captured by the camera 700; and, determining the first gripping force G1 based on the identified result.

Accordingly, since the first finger 100 and second finger 200 grip the object O with a sufficiently large gripping force in consideration of the weight, or the like, of the object O, slip may not occur, and it is possible to minimize trial and error that continuously raises the gripping force even if a slip occurs. In addition, when the first finger 100 and second finger 200 first grip the object O for the first time, it is possible to prevent the object O from being damaged by an unintentionally large gripping force in consideration of physical properties, or the like, of the object O.

The identifying may include identifying at least one of a shape, a weight, a physical property, and a volume of the object O by using the captured image and the learning model.

That is, the grip device 1 may more precisely determine a gripping force and slip by using the image captured by the camera 700 and a learning model stored in the memory 800.

The method of the grip device 10 according to one or more embodiments may further include determining a threshold gripping force at which the object begins to break based on the identified result; and based on the second gripping force being greater than or equal to the threshold gripping force, stopping the gripping by the first finger 100 and second finger 200.

Accordingly, even when the gripping force of the first finger 100 and second finger 200 continuously rise, it is possible to prevent a case where the object O is unintentionally damaged by the first finger 100 and second finger 200.

Although a preferred embodiment of the disclosure has been illustrated and described above, the disclosure is not limited to the specific embodiments described above, but various modifications may be made to a person skilled in the art to which the disclosure belongs without departing from the subject matter of the disclosure claimed, and such changes are within the scope of the claims.

What is claimed is:

1. A grip device comprising:

a first finger comprising a groove formed as a plurality of inclined surfaces on a gripping surface of the first finger;

a second finger facing the first finger;

a middle member comprising a protrusion region inserted into the groove on the gripping surface of the first finger, the middle member covering the gripping surface of the first finger, a first surface of the middle member facing the gripping surface of the first finger, a second surface of the middle member being opposite to the first surface;

a plurality of mono-axial force sensors, each mono-axial force sensor being respectively positioned on an inclined surface of the plurality of inclined surfaces and configured to detect a force only in one direction, the one direction being normal to the inclined surface, and the force being applied to the middle member by an object gripped between the first finger and the second finger, wherein the middle member is formed of a rigid material configured to transmit the force to the plurality of mono-axial force sensors without loss;

a driving motor configured to adjust a gripping force of the first finger and the second finger; and a processor configured to:

calculate a force vector applied to the middle member based on the forces detected by each of the plurality of mono-axial force sensors in the direction normal to each inclined surface, using sensing values received from the plurality of mono-axial force sensors, and based on a first force component of the force vector in a direction parallel to the second surface of the middle member being less than a preset value when the first finger and the second finger grip an object by a first gripping force, control the driving motor such that the first finger and the second finger grip the object by a second gripping force that is greater than the first gripping force.

2. The grip device of claim 1, wherein the processor is further configured to, based on a second force component of the force vector in a second direction being less than a predetermined value when the first finger and the second finger move in a first direction opposite to the second direction while gripping the object, control the driving motor such that the first finger and the second finger grip the object with the second gripping force.

3. The grip device of claim 1, wherein the plurality of inclined surfaces comprise a first inclined surface and a second inclined surface, and wherein the plurality of mono-axial force sensors comprise first and second mono-axial force sensors provided on the first and second inclined surfaces, respectively.

4. The grip device of claim 3, wherein the first inclined surface and the second inclined surface are angled to face at least partially vertically.

5. The grip device of claim 1, wherein the plurality of inclined surfaces comprise a first inclined surface, a second inclined surface, and a third inclined surface forming a triangular pyramid shape, and wherein the plurality of mono-axial force sensors comprise first, second, and third mono-axial force sensors provided on the first, second, and third inclined surfaces, respectively.

6. The grip device of claim 1, wherein the plurality of inclined surfaces comprise a first inclined surface, a second inclined surface, a third inclined surface, and a fourth inclined surface forming a shape of a quadrangular pyramid, and wherein the plurality of mono-axial force sensors comprise first, second, third, and fourth mono-axial force sensors provided on the first, second, third, and fourth inclined surfaces, respectively.

7. The grip device of claim 1, further comprising a camera configured to capture an image of the object, wherein the processor is further configured to:

identify at least one of a shape, a weight, a physical property, and a volume of the object based on the captured image, and determine the first gripping force based on a result of the identifying.

8. The grip device of claim 7, wherein the processor is further configured to:

determine a threshold gripping force at which the object begins to break based on the result of the identifying, and based on the second gripping force being greater than or equal to the threshold gripping force, control the driving motor so that the first finger and the second finger decrease the gripping force.

9. The grip device of claim 7, further comprising a memory storing a learning model trained to identify a feature of the object based on an input of image information of the object, wherein the processor is configured to identify the at least one of the shape, the weight, the physical property, and the volume of the object further based on the learning model.

10. The grip device of claim 1, wherein the second surface of the middle member is formed as a plane.

11. A method of controlling a grip device comprising a first finger comprising a groove formed as a plurality of inclined surfaces on a gripping surface of the first finger, a second finger facing the first finger, a middle member comprising a protrusion region inserted into the groove on the gripping surface of the first finger, the middle member covering the gripping surface of the first finger, a first surface of the middle member facing the gripping surface of the first finger, a second surface of the middle member being opposite to the first surface, and a plurality of mono-axial force sensors, each mono-axial force sensor being respectively positioned on an inclined surface of the plurality of inclined surfaces and configured to detect a force only in one direction, the one direction being normal to the inclined surface, the force being applied to the middle member by an object gripped between the first finger and the second finger, the middle member being formed of a rigid material configured to transmit the force to the plurality of mono-axial force sensors without loss, the method comprising:

gripping an object between the first finger and the second finger by a first gripping force;

receiving sensing values from the plurality of mono-axial force sensors;

calculating a force vector applied to the middle member based on the forces detected by each of the plurality of mono-axial force sensors in the direction normal to each inclined surface, using the received sensing values;

confirming slip based on a comparison of a first force component of the force vector in a direction parallel to the second surface of the middle member and a preset value; and based on a determination that slip has occurred, adjusting a gripping force of the first finger and the second finger to a second gripping force greater than the first gripping force.

12. The method of claim 11, wherein the confirming of the slip further comprises confirming slip based on a second force component of the force vector in a second direction being less than a predetermined value when the first finger and the second finger move in a first direction opposite to the second direction while gripping the object.

13. The method of claim 11, wherein the grip device further comprises a camera configured to capture an image of the object, the method further comprising:

identifying at least one of a shape, a weight, a physical property, and a volume of the object based on the captured image; and determining the first gripping force based on a result of the identifying.

14. The method of claim 13, wherein the grip device further comprises a memory storing a learning model trained to identify a feature of the object based on an input of image information of the object, and wherein the identifying of the at least one of the shape, the weight, the physical property, and the volume of the object is further based on the learning model.

15. The method of claim 13, further comprising:

determining a threshold gripping force at which the object begins to break based on the result of the identifying; and based on the second gripping force being greater than or equal to the threshold gripping force, decreasing the gripping force applied by the first finger and the second finger.

* * * * *